United States Patent [19]

Maier et al.

[11] Patent Number: 4,526,261
[45] Date of Patent: Jul. 2, 1985

[54] CLUTCH PLATE WITH CONTROL MEANS AND AT LEAST TWO ENERGY STORING DEVICES COOPERATING WITH THE CONTROL MEANS

[75] Inventors: Peter Maier, Bühl; Kurt Frietsch, Bühlertal, both of Fed. Rep. of Germany

[73] Assignee: Luk Lamellen und Kupplungsbau GmbH, Bühl, Fed. Rep. of Germany

[21] Appl. No.: 407,585

[22] Filed: Aug. 12, 1982

[30] Foreign Application Priority Data

Nov. 28, 1981 [DE] Fed. Rep. of Germany ....... 3147237

[51] Int. Cl.³ ............................ F16D 3/14; F16D 3/66
[52] U.S. Cl. ............................ 192/106.2; 192/70.17; 464/68
[58] Field of Search ............... 192/106.2, 106.1, 70.17; 464/68, 67, 66

[56] References Cited

U.S. PATENT DOCUMENTS

| 3,138,011 | 6/1964 | Stromberg | 464/68 X |
|---|---|---|---|
| 3,931,876 | 1/1976 | Beeskow et al. | 192/106.2 |
| 4,018,320 | 4/1977 | Schrape et al. | 192/106.2 |
| 4,036,341 | 7/1977 | Beeskow et al. | 192/106.2 |
| 4,044,874 | 8/1977 | Wörner | 192/106.2 |
| 4,122,931 | 10/1978 | Maucher | 192/106.2 |
| 4,354,586 | 10/1982 | Stanley | 192/106.2 |
| 4,376,477 | 3/1983 | Loizeau | 192/106.2 |
| 4,381,052 | 4/1983 | Maucher | 192/106.2 |
| 4,398,625 | 8/1983 | Beccaris | 192/106.2 |
| 4,433,770 | 2/1984 | Loizeau et al. | 192/106.1 X |
| 4,433,771 | 2/1984 | Caray | 192/106.1 X |

FOREIGN PATENT DOCUMENTS

| 0019526 | 11/1980 | European Pat. Off. | 192/106.1 |
|---|---|---|---|
| 2436288 | 2/1976 | Fed. Rep. of Germany. | |
| 1428557 | 3/1976 | United Kingdom | 192/106.2 |

Primary Examiner—Rodney H. Bonck
Assistant Examiner—David D. House
Attorney, Agent, or Firm—Peter K. Kontler

[57] ABSTRACT

A clutch plate for use in friction clutches has a hub with a mounting flange which is flanked by two discs one of which carries the friction coatings and which are rotatable, within limits, with reference to the hub and/or vice versa. A first coil spring resists a first stage of rotation of the hub and/or discs from a neutral angular position, a second coil spring cooperates with a load friction generating unit to resist the first portion of a second stage of rotation of the discs and/or hub from the neutral position, and several coil springs cooperate with the friction generating unit to oppose the second portion of such second stage of rotation of the discs and/or hub from neutral position.

35 Claims, 3 Drawing Figures

CLUTCH PLATE WITH CONTROL MEANS AND AT LEAST TWO ENERGY STORING DEVICES COOPERATING WITH THE CONTROL MEANS

BACKGROUND OF THE INVENTION

The present invention relates to clutch plates or clutch disc arrangements, especially to improvements in clutch plates for use in friction clutches. More particularly, the invention relates to improvements in clutch plates of the type wherein one component (including a clutch disc with one or more friction facings) is rotatable within limits relative to another component (including a hub) and/or vice versa, and wherein the relative angular displacement of the two components takes place against the opposition of one or more energy storing devices. Still more particularly, the invention relates to improvements in clutch plates of the type wherein a first stage of relative angular displacement between the two components is not, but a second stage is, opposed by a load friction unit having a control plate which cooperates with at least two energy storing devices to oppose rotation of the one component with reference to the other component and/or vice versa.

Clutch plates of the above outlined character are disclosed, for example, in commonly owned German Pat. No. 2,436,288. FIG. 1 of this patent shows a clutch plate with a load friction generating unit having a control plate cooperating with two coil springs. The arrangement is such that the friction generating unit becomes effective practically instantaneously, namely, in abrupt response to completion of the first stage of angular displacement of the one component relative to the other component and/or vice versa. Also, the damping action of the friction generating unit remains unchanged for each and every increment of that stage of angular movement of the one and/or the other component during which the friction generating unit is effective. It has been found that the patented clutch plate solves many problems as regards the suppression of noise in the power train between the engine and one or more driven parts of an automotive vehicle or in any power train in which a clutch employing the patented clutch plate is put to use. It has further been found that the useful life of the patented clutch plate is longer than that of theretofore known clutch plates, as well as that the patented clutch plate reduces the likelihood of vibrations and/or other stray movements in a friction clutch or the like. However, it was also ascertained that the patented clutch plate fails to constitute an optimum solution of numerous problems which arise in certain categories of automotive vehicles, particularly in vehicles of the type wherein, in accordance with a rather recent proposal, the RPM of the engine during idling is much lower than in earlier engines. It was also found that heretofore known clutch plates (including the aforediscussed patented clutch plate) are not ideally suited for use in the clutches of automotive vehicles which, in accordance with certain recent proposals, are designed to save weight not only as far as the parts of the engine but also as far as other parts of the vehicle are concerned. Noise is also a problem which must be overcome or at least alleviated in such types of vehicles. It is assumed that one of the main reasons for the just enumerated problems is the irregular progress of RPM in such types of vehicles.

OBJECTS AND SUMMARY OF THE INVENTION

An object of the invention is to provide a clutch plate which is constructed and assembled in such a way that it can reduce or eliminate noise, vibrations and/or other stray movements under circumstances when a conventional clutch plate is incapable of solving such problems.

Another object of the invention is to provide a clutch plate which is relatively simple and inexpensive, whose useful life is longer than that of heretofore known clutch plates, and which can be utilized as a superior substitute for clutch plates in existing friction clutches or analogous machines.

A further object of the invention is to provide a clutch plate wherein the extent to which the angular movement of the one and/or the other component is opposed can be selected with a high degree of accuracy and within a desired number of at least substantially predictable ranges.

An additional object of the invention is to provide novel and improved means for opposing angular displacements of the clutch disc relative to the hub of the clutch plate and/or vice versa.

Another object of the invention is to provide a clutch plate wherein the number of stages during each of which the angular displacements of the two components relative to one another are opposed to a different extent can be increased beyond the number of such stages in a conventional clutch plate and with a minimal outlay for parts as well as without increasing the space requirements of the clutch plate.

A further object of the invention is to provide a novel and improved method of opposing angular displacements of one component of a clutch plate relative to the other component and/or vice versa.

An additional object of the invention is to provide a clutch which embodies the improved clutch plate.

The invention resides in the provision of a clutch plate or clutch disc arrangement, especially for use in clutches, such as friction clutches which are employed in automotive vehicles. The improved clutch plate comprises a first component (such first component can comprise a hub and a mounting flange which surrounds the hub and is integral therewith or is otherwise rigidly connected thereto), a second component which is rotatable within limits with reference to the first component (the second component can comprise two coaxial discs which surround the hub and are disposed at opposite sides of the mounting flange), preferably in a clockwise as well as in a counterclockwise direction from and back to a neutral angular position, and novel and improved means for yieldably opposing rotation of the second component with reference to the first component and/or vice versa. The rotation opposing means comprises a friction generating unit which includes control means (such as a substantially plate-like annular body which is installed between the flange and one of the discs and is rotatable within limits with reference to the first component) and is designed to oppose rotation of the second component during a second stage which follows a first stage of such rotation from the neutral angular position (either clockwise or counterclockwise), and the rotation opposing means further comprises at least two compressible coil springs or other suitable energy storing devices which are installed to act between the control means and at least one of the components and to assist the control means in opposing rotation of the second component. One of the energy storing devices serves to cooperate with the control means in opposing rotation of the second component during a first portion and the other energy storing device serves to cooperate with the control means in opposing rotation of the second component during a subsequent second portion of the second stage. The force with which one of the energy storing devices opposes rotation of the second component preferably differs from the force with which the other of the energy storing devices opposes rotation of the second component. If the energy storing devices comprise or constitute springs, the resiliency of the spring of one of the energy storing devices preferably differs from the resiliency of the spring or springs forming part of or constituting the other energy storing device. Otherwise stated, the moment of resistance which one of the energy storing devices offers to rotation of the second component preferably deviates from the moment of resistance of the other energy storing device. It can also be stated that the moment of resistance which one of the energy storing devices generates to oppose rotation of the second component from its neutral angular position deviates from the moment of resistance which is generated by the other energy storing device.

The arrangement is preferably such that the energy storing device (hereinafter called the other energy storing device) which opposes rotation of the second component during the second portion of the second stage exerts a greater force than the energy storing device (hereinafter called the one energy storing device) which opposes rotation of the second component during the first portion of the second stage (the one energy storing device preferably opposes each and every portion of the second stage of movement of the second component from its neutral position). In other words, the other energy storing device can be designed to yieldably urge the second component toward the neutral angular position at least to such an extent as to reduce the second portion of the second stage to zero, and the one energy storing device can be designed to yieldably urge the second component to its neutral angular position at least to an extent such as to reduce the first and second portions of the second stage to zero.

The force with which the one energy storing device opposes rotation of the second component, at least during a certain part of the first portion of the second stage, is preferably less than the force with which such rotation is opposed by the friction generating unit. Also, the other energy storing device is preferably designed to oppose rotation of the second component, at least during a certain part of the second portion of the second stage, with a force which at least matches but preferably exceeds the force with which such rotation is opposed by the friction generating unit. The one and the other energy storing device can constitute two of a plurality of energy storing devices which act between the first and second components, at least during certain stages of rotation of the second component with reference to the first component and/or vice versa.

The one and the other energy storing device are preferably installed in such a way that they can act between the first and second components in parallelism with one another and that they can further act in parallelism with the control means of the friction generating unit.

In accordance with a presently preferred embodiment of the improved clutch plate, the one energy storing device comprises at least one resilient element (such as one of the aforementioned coil springs) and the other energy storing device comprises at least two resilient elements. The resilient elements of the other energy storing device preferably operate in parallelism with the resilient element of the one energy storing device during the second portion of second stage of rotation of the second component. The resilient elements preferably constitute (or can constitute) compressible coil springs which are interposed between the second component and the control means of the friction generating unit.

The rigidity of the resilient elements of the other energy storing device preferably exceeds (and most preferably substantially exceeds) the rigidity of the resilient element or elements of the one energy storing device.

The resilient element or elements of the other energy storing device are preferably installed between the control means and the first component in prestressed condition so that the initial stress and hence the initial resistance of such resilient elements to rotation of the second component from neutral angular position exceeds the force with which the friction generating unit opposes such rotation of the second component. The one and the other energy storing device preferably serve to jointly oppose rotation of the second component from its neutral angular position during the second portion of the second stage, and the force with which such devices jointly oppose rotation of the second component exceeds the force with which the friction generating unit opposes such rotation of the second component.

As mentioned above, the control means can be disposed between the flange of the first component and one of the discs which form part of the second component, and the friction generating unit preferably further comprises spring means, such as a diaphragm spring which is interposed between the flange and the other disc and directly engages the control means. Such diaphragm spring reacts against the other disc and biases the control means axially toward the one disc of the second component. The diaphragm spring or the control means comprises at least one axially extending projection (e.g., an arm which is integral with an intermediate portion of the control means), and the flange has an opening through which the projection extends into engagement with the control means or with the diaphragm spring (depending upon whether the projection is provided on the control means or on the diaphragm spring). Furthermore, the control means preferably includes at least one protuberance (preferably two sets or groups or protuberances in the form of lugs which are integral with and extend axially from the outer marginal portion of the control means), and the flange has at least one socket receiving the protuberance with a predetermined clearance, as considered in the circumferential direction of the flange and hub. The protuberance or protuberances cooperate with the aforementioned projection or projections to limit the extent or angular movement of the control means with reference to the first component. The control means is rotatable with reference to the first component in first and second directions, and the protuberance or protuberances of one of the aforementioned groups or sets then serve to limit the extent of rotation of the control means in one direction while the protuberance or protuberances of the other set or group serve to limit the extent of rotation of the control means (with reference to the first component) in the other direction.

The plate-like annular body of the control means can be provided with several openings in the form of windows for portions of the energy storing devices. For example, the control means can be provided with three pairs of windows and the windows of each pair are preferably disposed diametrically opposite each other with reference to the common axis of the first and second components. The rotation opposing means can comprise at least one additional energy storing device (i.e., at least one device in addition to the aforediscussed one and other energy storing device) which is installed in one window of a first pair of windows in the control means, and the one energy storing device is then preferably installed in the other window of such first pair. As stated before, the other energy storing device can comprise at least two resilient elements which are installed in two windows of the second and third pair of windows in the control means. The other window of the first pair of windows is preferably dimensioned in such a way that the control means and the second component cooperate to stress the one energy storing device as soon as the extent of rotation of the second component from its neutral position exceeds the first stage, and the windows for the resilient elements of the other energy storing device are preferably dimensioned in such a way that these resilient elements are stressed by the control means in cooperation with the second component only when the extent of rotation of the second component from its neutral angular position is such that the latter completes the first stage plus the first portion of the second stage of angular movement with reference to the first component. The dimensions of the one window of the first pair are preferably such that the additional energy storing device is stressed between the control means and the second component simultaneously with the resilient elements of the other energy storing device. The additional energy storing device opposes each and every portion of each stage of angular movement of the second component from its neutral position, the one energy storing device preferably opposes each and every portion of the second stage of rotation of the second component, and the other energy storing device opposes rotation of the second component only during the second portion of the second stage of angular movement of the second component from its neutral position.

The novel features which are considered as characteristic of the invention are set forth in particular in the appended claims. The improved clutch plate itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
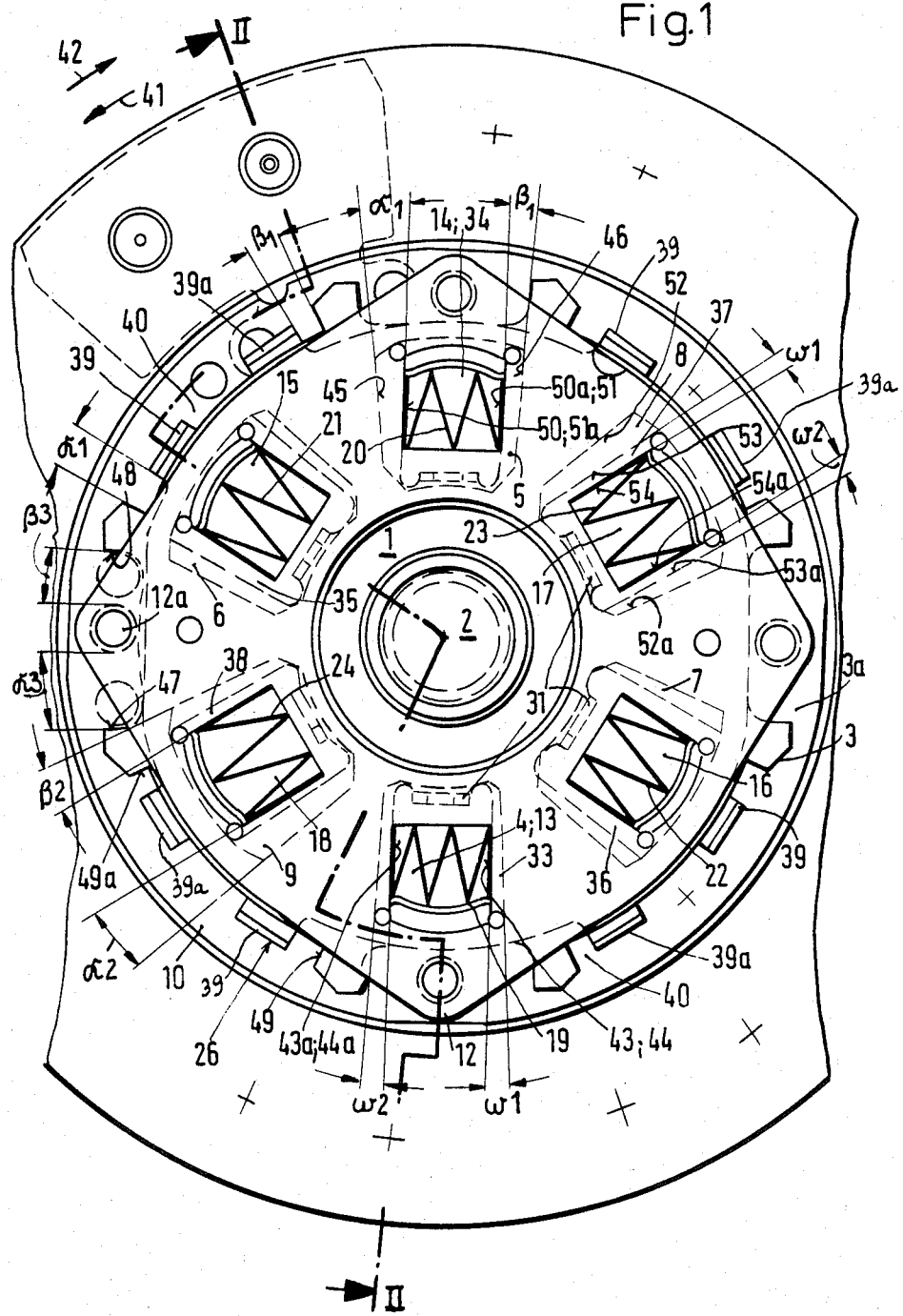
FIG. 1 is a fragmentary elevational view of a clutch plate with six energy storing coil springs which embodies one form of the present invention.
Figure 2:
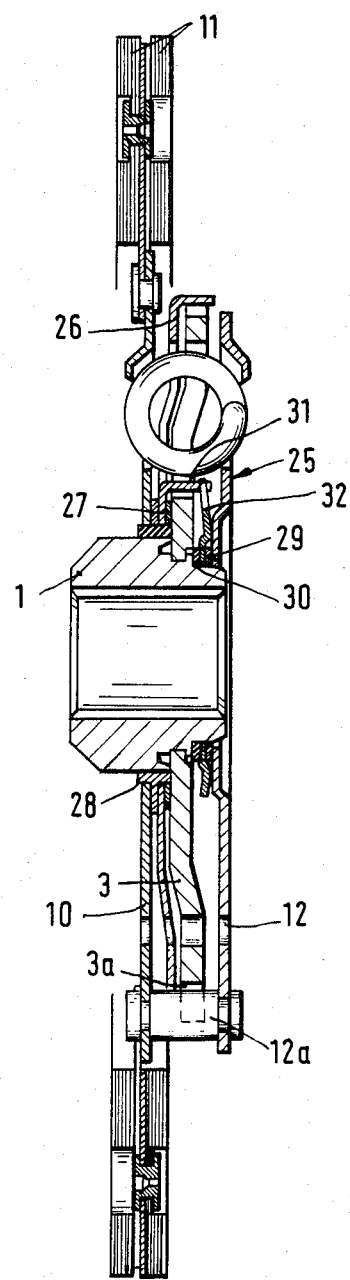
FIG. 2 is a sectional view of the clutch plate as seen in the direction of arrows from the line II—II of FIG. 1.

Referring to FIGS. 1 and 2, there is shown a clutch plate which includes a first or output component comprising a hub 1 having internal splines and being non-rotatably mounted on a shaft 2 (e.g., the input shaft of a change-speed transmission). The first component further comprises a mounting flange 3 which is non-rotatably secured to and surrounds the hub 1 (the flange can be integral with the hub). The flange 3 has an annulus of openings or windows 4, 5, 6, 7, 8 and 9. In FIG. 1, these openings are respectively located at the six, twelve, ten, four, two and eight o'clock positions.

A second or input component of the clutch plate comprises a clutch disc 10 which is disposed at one side of the mounting flange 3 and carries the customary friction coatings 11. One of these coatings can be engaged by a flywheel (e.g., the flywheel on the crankshaft of the internal combustion engine in an automotive vehicle) and the other coating 11 can be engaged by the pressure plate of a friction clutch wherein the clutch plate transmits torque between the flywheel and the shaft 2. The second component of the clutch plate further comprises a disc 12 which constitutes a guide, which is rotatable relative to the hub 1 and which is located at the other side of the mounting flange 3. The discs 10 and 12 are connected to each other by a set of distancing elements 12a in the form of rivets whose shanks extend with limited play (as considered in the circumferential direction of the clutch plate) into cutouts or recesses 3a provided in the periphery of the mounting flange 3. The width of the cutouts 3a determines the maximum extent of angular movement of the second component relative to the first component and/or vice versa.

Each of the discs 10 and 12 is formed with six openings or windows 13, 14, 15, 16, 17 and 18. Each of the windows 13 to 18 in the disc 10 has the same size as the similarly referenced window in the disc 12, and each of the windows 13 to 18 in the disc 10 is in register with the similarly referenced window in the disc 12.

The means for opposing and damping vibratory movements of the first component relative to the second component and/or vice versa comprises six energy storing devices in the form of coil springs 19, 20, 21, 22, 23 and 24. As can be seen in FIG. 1, the coil spring 19 is installed in the windows 13 of the discs 10, 12 and in the window 4 of the mounting flange 3; the coil spring 20 is installed in the windows 14 of the discs 10, 12 and in the window 5 of the flange 3; the coil spring 21 is installed in the windows 15 of the discs 10, 12 and in the window 6 of the flange 3; the coil spring 22 is installed in the windows 16 of the discs 10, 12 and in the window 7 of the flange 3; the coil spring 23 is installed in the windows 17 of the discs 10, 12 and in the window 8 of the flange 3; and the coil spring 24 is installed in the windows 18 of the discs 10, 12 and in the window 9 of the flange 3.

The clutch plate further comprises a load friction generating and control unit 25 which also serves to oppose or damp vibratory movements of the first and/or second component, as considered in the circumferential direction of the clutch plate, and is rotatably mounted on the hub 1. The friction generating unit 25 comprises an annular friction control plate 26 which is installed in the space between the clutch disc 10 and the mounting flange 3, a first annular friction pad 27 which is installed between the control plate 26 and the flange 3, and a second annular friction pad 28 which is installed between the disc 10 and the control plate 26 and is non-rotatably connected with the disc 10. The friction pad 28 has a substantially T-shaped cross-sectional outline and includes a sleeve-like or cylindrical portion which directly surrounds the peripheral surface of the hub 1 and is surrounded by the inner marginal portion of the clutch disc 10. Furthermore, the sleevelike portion of the friction pad 28 extends between the periphery of the hub 1 and the inner marginal portion of the control plate 26 as well as the inner marginal portion of the first friction pad 27.

The space between the flange 3 and the disc 12 accommodates a further annular friction pad 29 and a corrugated annular spring 30 which bears against the flange 3 and biases the friction pad 29 against the disc 12. Moreover, and since the rivets 12a connect the disc 12 to the disc 10, the spring 30 biases the clutch disc 10 toward the flange 3. This, in turn, causes the clutch disc 10 to bias the control plate 26 and the friction pads 27, 28 toward the flange 3.

The control plate 26 of the friction generating unit 25 comprises projections or arms 31 which extend in parallelism with the axis of the clutch plate and through apertures which are provided therefor in the mounting flange 3. Such apertures can constitute the aforementioned windows 4 to 9 of the mounting flange 3 i.e., those windows which receive portions of the coil springs 19 to 24. The configuration of the windows 4 to 9 is preferably such that the flange 3 can turn relative to the control plate 26 and/or vice versa during a first stage of relative angular movement between the two components of the clutch plate, i.e., the arms 31 strike against the surfaces bounding the respective openings 4 to 9 after the control plate 26 has completed a certain angular movement (angle alpha₁ or beta₁) relative to the first component and/or vice versa.

The arms 31 are further engaged by an annular cup spring or diaphragm spring 32 which is installed between the mounting flange 3 and the disc 12 and whose radially outermost part is interlocked with the arms 31. An intermediate part of the diaphragm spring 32 bears against the disc 12. The function of the diaphragm spring 32 is to urge the control plate 26 against the friction pad 28 whose disc-shaped radially outwardly extending portion or washer is disposed between the control plate 26 and the disc 10. It will be noted that the friction pad 28 is indirectly stressed by the diaphragm spring 32 as well as by the corrugated spring 30. The friction pads 27 and 29 are biased solely by the corrugated spring 30 to generate a so-called idling friction. The materials, configuration and mounting of the diaphragm spring 32 and friction pad 28 are such that frictional torque which is generated by the parts 28 and 32 is greater than frictional torque which is generated by the parts 27, 29 and 30 which constitute the idling friction generating means.

FIG. 1 shows that the control plate 26 is formed with openings or windows 33, 34, 35, 36, 37 and 38 for portions of the springs 19 to 24 which oppose rotation of the two components of the clutch plate with reference to one another.

The dimensions of the windows 4 to 9 in the mounting flange 3, of the windows 33 to 38 in the control plate 26, of the windows 13 to 18 in the disc 10, and of the windows 13 to 18 in the disc 12 are selected in such a way that the spring 19 is effective to oppose relative angular movement of the two components during each and every portion of each stage of rotation of the hub 1 and mounting flange 3 relative to the discs 10, 12 and/or vice versa. The spring 19 is not assisted by the friction generating unit 25. The spring 20 opposes each portion of a second stage of relative movement between the two components of the clutch plate, and the springs 21, 22, 23 and 24 oppose only a certain portion of such second stage of relative movement. In the illustrated embodiment, the friction generating unit 25 cooperates with the spring 20 (during each portion of the second stage) and with the springs 23, 24 (during a certain portion of the second stage). To this end, the dimensions of the windows 35, 36 in the control plate 26 are selected in such a way that the springs 21 and 22 cannot act upon the control plate.

The peripheral or outer marginal portion of the control plate 26 (which is a substantially annular body) is provided with axially parallel control portions in the form of protuberances or lugs 39 and 39a which extend into cutouts or sockets 40 of the mounting flange 3. As can be seen in FIG. 1, the lugs 39, 39a are uniformly distributed along the periphery of the control plate 26. In the illustrated embodiment, the control plate 26 is formed with a group or set of four lugs 39 which are offset by 90 degrees, and with a group or set of four lugs 39a which are also offset by 90 degrees, as considered in the circumferential direction of the clutch plate.

The arrow 41 indicates the direction of pull, namely, the direction in which the second component including the discs 10 and 12 (which are or can be driven by a prime mover, such as the engine of an automotive vehicle) rotates in order to drive the first component including the hub 1 and its mounting flange 3. The arrow 42 indicates the opposite direction, namely, the direction in which the component including the hub 1 can turn the discs 10, 12, e.g., when the vehicle is coasting.

The operation is as follows:

When the discs 10 and 12 turn with reference to the hub 1 in the direction of arrow 41 or 42, the coil spring 19 is first to yieldably oppose such angular displacement of the second component because the edge faces 43, 43a in the windows 13 of the discs 10, 12 register with the edge faces 44, 44a in the window 4 of the mounting flange 3. The width of the windows 13, as considered in the circumferential direction of the clutch plate, matches the width of the window 4; therefore, the spring 19 invariably tends to return the discs 10, 12 of the second component to a more or less predetermined neutral angular position with reference to the first component including the hub 1 and the mounting flange 3. One cannot always refer to a "predetermined" neutral angular position of the discs 10, 12 with reference to the hub 1 and/or vice versa because the neutral position can shift to either side of a theoretical or ideal neutral angular position which the discs 10, 12 would assume in the absence of any unpredictable friction, in the absence of deviations of actual friction between the two components from a desired value and/or when the bias of the springs 19 to 24 is exactly as calculated.

FIG. 1 shows the second component in the neutral angular position. After the discs 10, 12 complete the first stage of their angular movement from the neutral position, namely, an angular movement through the angle alpha₁ (in the direction of arrow 41) or through the angle beta₁ (in the direction of arrow 42), the spring 20 begins to store energy in addition to the spring 19. This is due to the fact that the edge face 45 in the window 5 of the mounting flange 3 engages the coil spring 20 after the discs 10, 12 complete an angular movement through the angle $alpha_1$ in the direction of arrow 41. As stated before, the coil spring 20 is mounted in part in the windows 14 of the discs 10 and 12. Analogously, the edge face 46 in the window 5 of the mounting flange 3 engages and stresses the spring 20 when the discs 10, 12 complete an angular movement through the angle $beta_1$ (in the direction of arrow 42). The springs 21 to 24 begin to store energy after the discs 10, 12 complete an angular movement through the angle $alpha_1$ or $beta_1$ and thereupon through the angle $alpha_2$ (arrow 41) or $beta_2$ (arrow 42). The springs 21 to 24 then offer resistance to rotation of the discs 10, 12 in addition to that resistance which is offered by the springs 19 and 20. Thus, the spring 19 is active during the first and second stages of rotation of the discs 10, 12 from their neutral position, the spring 20 is active during each portion of the second stage of such rotation from neutral position, and the springs 21 to 24 are active only during certain portion or portions of the second stage.

The rivets 12a determine the maximum extent (the first plus the second stages) of angular displacement of the discs 10, 12 relative to the first component including the hub 1 and the mounting flange 3. These rivets extend into the recesses 3a of the mounting flange 3 and engage the surfaces 47 or 48 of the flange at the one or the other end of the respective sockets 3a (as considered in the circumferential direction of the clutch plate) when the discs 10, 12 complete an angular movement through the angle $alpha_3$ (arrow 41) or $beta_3$ (arrow 42).

When the discs 10, 12 start to leave the neutral angular position shown in FIG. 1, they turn against the opposition of the friction pads 27 and 29 of the idling friction generating means because the friction moment of the unit 25 is greater than the force of the spring 19 and, therefore, the unit 25 turns with the discs 10 and 12, i.e., in synchronism with the second component of the clutch plate. The idling friction is terminated when the lugs 39 reach the surfaces 49 in the sockets 40 (while the discs 10, 12 turn in the direction of arrow 41) or when the lugs 39a reach the surfaces 49a in the sockets 40 (while the discs 10, 12 turn in the direction of the arrow 42). This arrests the friction generating unit 25, i.e., the unit 25 ceases to turn relative to the mounting flange 3 of the first component with the result that the discs 10, 12 begin to turn relative to the unit 25 while the rivets 12a move toward engagement with the surfaces 47 or 48 in the cutouts 3a of the flange 3. During this second stage of angular movement of the discs 10 and 12, the discs rotate against the resistance of a rather pronounced friction moment between the control plate 26 and the disc 10. Additional friction develops between the diaphragm spring 32 and the disc 12. The friction pad 29 is effective during each and every stage of angular movement of the discs 10 and 12 with reference to the mounting flange 3. On the other hand, the friction pad 27 ceases to generate friction when the unit 25 becomes effective because the control plate 26 is then held against rotation with reference to the mounting flange 3.

In the illustrated embodiment, the lugs 39 and 39a of the control plate 26 are mounted or distributed in such a way that the discs 10 and 12 can turn from their neutral angular position through the angle $alpha_1$ or through the angle $beta_1$ (in the direction of arrow 41 or 42) before the coil spring 20 begins to offer resistance in addition to that which is offered by the coil spring 19.

The width of the windows 14 in the discs 10 and 12 (as considered in the circumferential direction of the clutch plate) is the same as that of the window 34 in the control plate 26 (the windows 14 and 34 accommodate the coil spring 20). Consequently, when the discs 10, 12 complete an angular movement through the angle $alpha_1$ (arrow 41), the edge face 50 in the window 34 of the control plate 26 and the edge faces 51a in the windows 14 of the discs 10 and 12 move into register with the edge face 45 in the window 5 of the mounting flange 3. When the discs 10, 12 complete an angular movement through the angle $beta_1$ (arrow 42), the edge face 50a in the window 34 of the control plate 26 and the edge faces 51 in the windows 14 of the discs 10, 12 move into register with the edge face 46 in the window 5 of the mounting flange 3. If the discs 10, 12 continue to turn in the direction of arrow 41, the spring 20 is deformed by the edge face 45 in the window 5 of the mounting flange 3 and the registering edge face 50 in the window 34 of the control plate 26 on the one hand, and by the edge faces 51 in the windows 14 of the discs 10, 12 on the other hand.

Analogously, when the discs 10, 12 begin to turn through an angle exceeding the angle $beta_1$ (arrow 42), the spring 20 is deformed by the edge face 46 of the mounting flange 3 and the edge face 50a in the window 34 of the control plate 26 on the one hand, and by the edge faces 51a in the windows 14 of the discs 10, 12 on the other hand. The bias of the spring 20 is selected in such a way that the force with which this spring tends to resist the movement of the control plate 26 (at least during angular movement of the discs 10, 12 between the angles $alpha_1$ and $alpha_2$ or $beta_1$ and $beta_2$) is less pronounced than the friction moment which is generated by the unit 25. This ensures that the spring 20 is incapable of restoring the unit 25 to the position which is shown in FIG. 1 while the discs 10, 12 turn through the angle $alpha_2$ minus $alpha_1$ or through the angle $beta_2$ minus $beta_1$. Consequently, when the direction of angular movement of the discs 10, 12 is reversed (from that in the direction of arrow 41 to that in the direction of arrow 42), there develops a delayed or carry-over friction which will be discussed with reference to FIG. 3.

Figure 3:
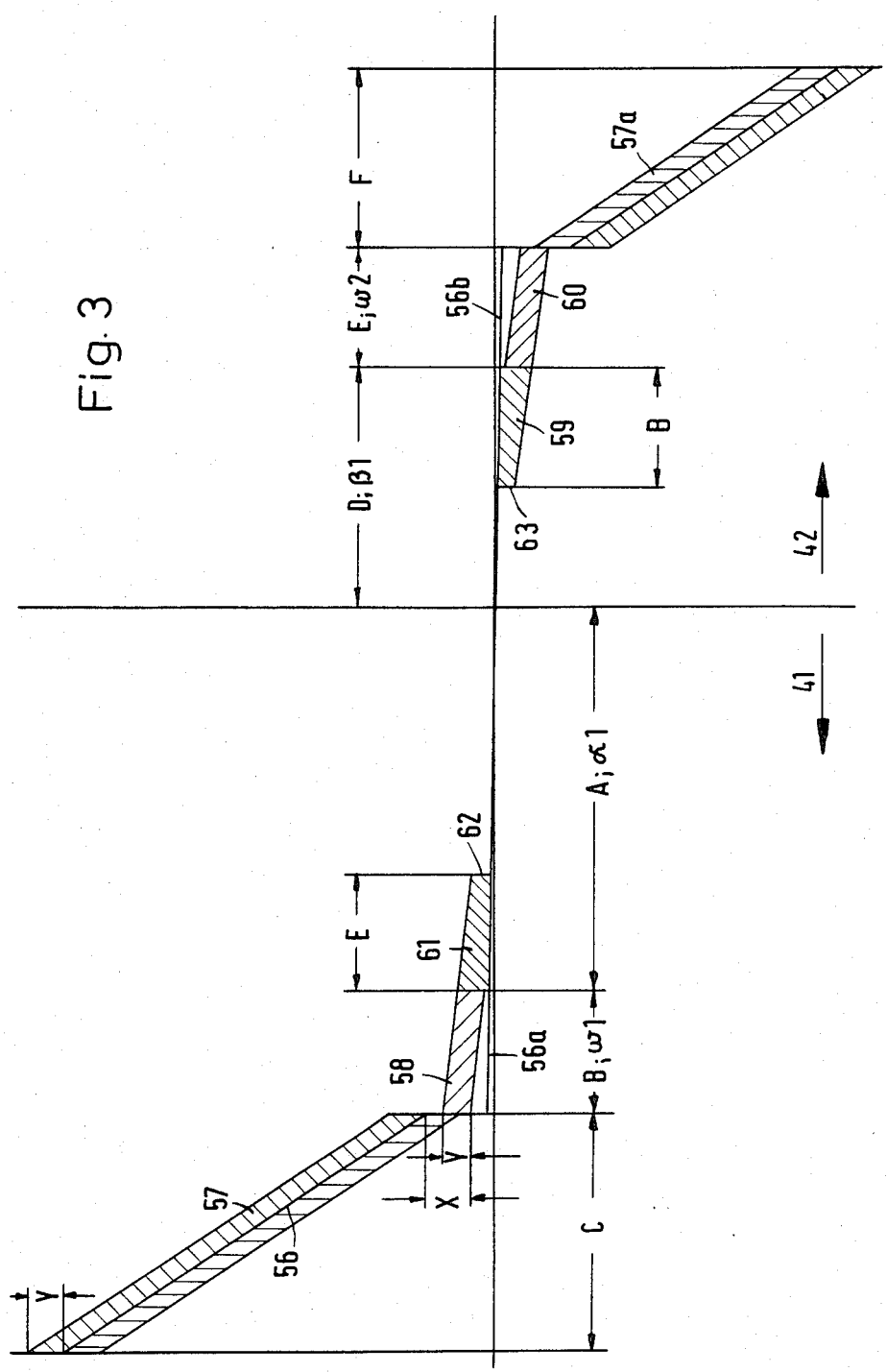
FIG. 3 is a diagram showing the relationship of forces during different stages of angular movement of the one and/or other component of the clutch plate from the neutral angular position.

In order to ensure that the springs 23 and 24 cannot be stressed by the control plate 26 before the discs 10, 12 complete an angular movement through the angle $alpha_2$ or $beta_2$, the width of the windows 37 and 38 in the control plate 26 (as considered in the circumferential direction of the clutch plate) for the springs 23 and 24 exceeds the width of the windows 17 and 18 in the discs 10, 12 by an angle which corresponds to the difference between the angles $alpha_1$ and $alpha_2$ in the direction of arrow 41 plus the difference between the angles $beta_1$ and $beta_2$ in the direction of arrow 42. In FIGS. 1 and 3, the difference between the angles $alpha_1$ and $alpha_2$ is shown at $omega_1$, and the difference between the angles $beta_1$ and $beta_2$ is shown at $omega_2$.

When the discs 10 and 12 complete an angular movement through the angle $alpha_2$ (in the direction of arrow 41), the edge faces 52 in the windows 6 to 9 of the mounting flange 3 and the edge faces 54 in the windows 15 to 18 of the discs 10, 12 register with one another. Also, the edge faces 52 in the windows 8, 9 and the edge faces 54 in the windows 17, 18 register with the edge faces 53 in the windows 37, 38 of the control plate 26. Analogously, the edge faces 52a in the windows 6 to 9 of the mounting flange 3 and the edge faces 54a in the windows 15 to 18 of the discs 10, 12 are in register with one another when the discs 10, 12 complete an angular movement through the angle beta$_2$ (arrow 42). At such time, the edge faces 52a in the windows 8, 9 and the edge faces 54a in the windows 17, 18 register with the edge faces 53a in the windows 37, 38 of the control plate 26. As already mentioned above, the width of the windows 35, 36 in the control plate 26 is selected in such a way that the springs 21, 22 cannot act upon the control plate 26, i.e., the width of the windows 35, 36 (as considered in the circumferential direction of the clutch plate) at least slightly exceeds the width of the windows 37 and 38 in the control plate 26. When the angle alpha$_2$ is exceeded, the springs 21 to 24 are compressed in parallel with the springs 19 and 20 between the edge faces 52 of the mounting flange 3 and (for the springs 23, 24) also between the edge faces 53 of the control plate 26 and between the edge faces 54a of the discs 10, 12 while the discs 10, 12 continue to rotate in the direction of arrow 41. When the discs 10, 12 continue to rotate beyond the angle beta$_2$ (arrow 42), the springs 21 to 24 are compressed by the edge faces 52a, 53a and 54 in a similar manner. When the angular displacement of the discs 10, 12 from their neutral angular position exceeds the angle alpha$_2$ or beta$_2$, the restoring force which the springs 23 and 24 apply to the control plate 26 exceeds the frictional force which is generated by the unit 25. This ensures that the friction generating unit 25 is invariably returned to a starting position in which it is ready to become effective when the extent of angular movement of the discs 10, 12 exceeds the angle alpha$_1$ or beta$_1$.

The spring 19 is effective during each and every portion of each stage of angular movement of the discs 10, 12 from their neutral angular position and cannot be influenced by the friction generating unit 25 because the width of the window 33 in the control plate 26 (as seen in the circumferential direction of the clutch plate) exceeds the width of the windows 13 in the discs 10, 12 by the angle omega$_1$ in the direction of arrow 41 and by the angle omega$_2$ in the direction of arrow 42.

The operation of vibration damping means in the improved clutch plate will be described with reference to FIG. 3, especially as regards the generation of an advanced or delayed friction. The solid line 56 is the characteristic curve of the damping effect which is produced by the springs 19 to 24, and the hatched areas 57 to 61 denote the frictional damping action which is generated by the unit 25 and is superimposed upon the characteristic curve 56 of the springs.

Starting from the neutral angular position of the discs 10, 12 as shown in FIG. 1, and proceeding in the direction of arrow 41, the spring 19 is active in the region A (angle alpha$_1$) together with the idling friction generating means including the friction pads 27, 29 and corrugated spring 30. In view of relatively small frictional damping action of the idling friction generating means (as compared with that of the unit 25), such damping action during the first stage of angular movement of the discs 10, 12 is not even indicated in the diagram of FIG. 3.

In the region B (first portion of the second stage), the resistance which the spring 19 offers to rotation of the discs 10, 12 is supplemented by the resistance which is offered by the spring 20. Furthermore, during the initial stage of the corresponding angular displacement of the discs 10 and 12, the friction generating unit 25 becomes effective as a result of engagement of the lugs 39 of the control plate 26 with the corresponding edge faces of the mounting flange 3. The damping action of the unit 25 during the first portion of the second stage is denoted by the hatched area 58 shown in the diagram of FIG. 3. Since the restoring force which the coil spring 20 applies to the discs 10, 12 in the region B is weaker than the frictional force of the unit 25, a reversal of the direction of angular movement of the discs 10, 12 in the region B does not entail any changes in the position of the unit 25 relative to the discs 10 and 12, i.e., only the idling friction generating means including the parts 27, 29 and 30 is active together with the spring 19 (this is indicated in FIG. 3 by the line 56a).

In the region C (namely, in the second portion of the second stage), the third energy storing group including the springs 21 to 24 becomes effective in addition to the springs 19 and 20, and the friction generating unit 25 also remains effective (note the hatched area 57 in the diagram of FIG. 3). If the direction of rotation is reversed, the unit 25 remains effective during rotation in the new direction (arrow 42) because, at such time, the restoring torque which the springs 23 and 24 apply to the control plate 26 exceeds the friction-induced moment of the unit 25. To this end, the springs 23 and 24 are subjected to initial stressing (indicated in FIG. 3 at X) which exceeds the frictional force Y generated by the unit 25.

During return movement of the discs 10, 12 toward their neutral angular position, namely, during movement from the region C to the region B, the unit 25 trails behind the discs 10, 12 by the angle omega$_1$ (i.e., in the region B) due to the aforediscussed selection of characteristics of the spring 20. This means that the unit 25 is ineffective so that, as the discs 10, 12 continue to advance in the regions B and A, only the idling friction generating means 27, 29, 30 of the spring 19 are effective.

If the discs 10 and 12 continue to rotate with reference to the mounting flange 3 in the direction of arrow 42, i.e., from the region A and beyond the neutral angular position, the unit 25 becomes effective before the discs 10, 12 reach the regions E and F (second stage), namely, in the region D when the discs 10, 12 complete an angular movement beyond the neutral position and reach the region B within the region D. The exact timing of the unit 25 becoming effective is at the instant when the discs 10, 12 are located at the boundary 63 in the region D, i.e., at the start of the region B which is the same as D minus omega$_1$. Otherwise stated, the extent of angular displacement indicated at B corresponds to the angle through which the unit 25 lags behind the discs 10, 12 during rotation in the direction of arrow 41. This means that the lugs 39a reach the edge faces 49a of the mounting flange 3 earlier than during rotation in the direction of arrow 41, namely, by an interval of time which is required by the discs 10, 12 to cover the angle omega$_1$ (region B).

In the region B, the spring 20 dissipates energy which remained stored between the control plate 26 and the discs 10, 12 in view of the high friction moment of the unit 25. This results in a reduction of the initial stress which tends to rotate the control plate 26 relative to the discs 10 and 12 so that the share of friction which is compensated for by the initial stressing of the spring 20 becomes smaller. This is denoted in FIG. 3 by the hatched area 59 indicating increasing friction up to the beginning of the region E.

During advancement of discs 10, 12 into the region E (first portion of the second stage), the spring 20 is compressed and acts in addition to the spring 19. Furthermore, during transition into the region E, the unit 25 is fully effective because, when the spring 20 is compressed, it does not oppose the action of the unit 25.

In the region F (second portion of the second stage), the springs 21 to 24 become effective in the same way as in the region C during rotation in the direction of arrow 41, i.e., the springs 21 to 24 assist the springs 19 and 20 in opposing rotation of the discs 10 and 12 with reference to the hub 1 and mounting flange 3. The damping effect of the unit 25 is indicated by the hatched area 57a; this unit acts in addition to the springs 19 to 24. If the direction of rotation is reversed (back to the direction indicated by the arrow 41), the action of the unit 25 remains unchanged in the region F due to the aforediscussed initial stressing (X) of the springs 23 and 24 which exceeds the frictional force Y generated by the unit 25.

During advancement from the region F into the region E (i.e., from the second back into the first portion of the second stage), the unit 25 lags behind the discs 10, 12 by the angle omega$_2$ (note the region E) because the stress of the spring 20 does not suffice to rotate the unit 25 with reference to the discs 10 and 12. Consequently, when the discs 10, 12 move back toward their neutral angular position, namely, in the region E of the diagram shown in FIG. 3, only the idling friction generating means 27, 29, 30 and the spring 19 are effective as indicated by the line 56b.

If the discs 10, 12 move from the region D and beyond the neutral position (while rotating in the direction of arrow 41), the unit 25 is effective not only in the regions B and C (second stage) but also already in the region A (first stage), namely, in the region E (angle omega$_2$) which corresponds to the angle by which the unit 25 has trailed the discs 10 and 12 during rotation in the direction of arrow 42. This entails a reduction of stressing of the spring 20, the same as during rotation in the direction of arrow 42. The spring 20 remained stressed between the control plate 26 and the discs 10, 12 up to the beginning of region E in view of high friction moment of the unit 25. This again results in a reduction of that portion of friction which is generated by the unit 25 and was theretofore compensated for by the spring 20 whereby the friction increases as indicated in FIG. 3 by the hatched area 61 which extends all the way to the start of the region B. As the discs 10 and 12 continue to rotate in the direction of arrow 41, the mode of operation in the regions B and C (first and second portions of the second stage) is the same as described above.

The diagram of FIG. 3 is characteristic of a clutch plate design according to which the spring (in the illustrated embodiment the coil spring 20) that is first to cooperate with the unit 25 is capable of applying to the control plate 26a restoring force smaller than the friction moment of the unit 25. This entails an abrupt rise of friction (namely, the rise shown in FIG. 3 at 62) while the discs 10, 12 rotate in the direction of arrow 41 and at 63 while the discs rotate in the opposite direction (arrow 42). The areas 61 and 59 can be reduced in size in a modified clutch plate wherein the spring 20 is replaced by a spring whose restoring force equals or exceeds (i.e., at least matches) the friction moment of the unit 25 (at least during certain portions of angular movement of the discs 10 and 12 in the region B (omega$_1$) or E (omega$_2$) which respectively follows the region A or D (first stage). In such embodiment of the improved clutch plate, some friction prevails during return movement of the discs 10, 12 to their neutral angular position, at least during movement through a portion of the region B or E, namely, during movement from the region F (arrow 41) or during movement from the region C (arrow 42).

The improved clutch plate can be designed in such a way that the rigidity or hardness of the spring 20 (which is active during the entire second stage of rotation of the discs 10, 12 relative to the hub 1 and/or vice versa) matches the rigidity or hardness of the springs 23, 24 which oppose rotation of the discs 10, 12 only during the second portion (region C or F) of rotation of the discs relative to the hub. In other words, the resistance which the spring 20 offers to rotation of the discs 10, 12 can match the resistance which is offered by the springs 23, 24. However, and in order to obtain a spring characteristic which is best suited for a particular utilization of the clutch plate, it is often advisable to design the latter in such a way that the rigidity of the spring 20 deviates from that of the springs 23, 24. It is further often desirable to mount the springs 19 to 24 in the form of an annulus whose center is located on the common axis of the discs 10, 12 and hub 1, i.e., in such a way that each of the six springs is disposed at the same distance from the hub 1, as considered in the radial direction of the clutch plate. However, it is equally possible to mount certain springs or certain groups of springs at different radial distances from the axis of the hub 1; for example, the spring 19 can be installed at a first distance, the spring 20 can be installed at a second distance and the springs 21 to 24 can be installed at a third distance from the hub. This enables the springs 19, 20 and 21-24 to exhibit or to generate different moments of resistance to rotation of the discs 10, 12 and/or hub 1 as a result of differences in the lever arms.

In the illustrated embodiment of the clutch plate, the force with which the spring 20 tends to rotate the discs 10, 12 and/or the hub 1 toward the neutral angular position (at least during a certain part of the first portion of the second stage) is smaller than the force of the springs 23, 24 which are active during the second portion of the second stage of rotation of the hub 1 and/or discs 10, 12 from the neutral angular position. Consequently, the force with which the springs 20 and 23, 24 tend to rotate the discs 10, 12 and/or the hub 1 back to the neutral position evidently exceeds the force with which the spring 20 urges the first and/or second component of the clutch plate toward the neutral angular position. Furthermore, the force with which the spring 20 tends to return the first and/or second component of the clutch plate to neutral angular position is smaller than the frictional resistance which the unit 25 offers to rotation of the first and/or second component, at least during a certain part of the first portion of the second stage. The force with which the springs 20, 23 and 24 tend to rotate the first and/or second component of the clutch plate back to the neutral angular position is greater than the aforementioned frictional resistance of the unit 25. This is desirable and advantageous in many types of clutches because it ensures a smooth and gradual establishment and increase of the frictional damping action during transition from the neutral or normal angular position into the first or second stage at either side of the neutral position. It has been found that the transition is especially soft and gradual if (as mentioned above) the resistance which the springs acting during the first portion of the second stage offer to further rotation of the one and/or other component of the clutch plate from the region B (arrow 41) into the region C or from the region E (arrow 42) into the region F at least approximates the force with which the unit 25 opposes such rotation.

As shown, the springs 20 and 23, 24 which are respectively active during the entire second stage and during the second portion of the second stage of rotation of the one and/or other component from neutral angular position are active between the hub 1 (and more particularly between the mounting flange 3) and the discs 10, 12 of the second component of the clutch plate, the same as the springs 19, 21 and 22. The various groups of coil springs act in parallel and in parallel with the control plate 26 of the friction generating unit 25. This contributes to simplicity of the clutch plate.

However, it is equally within the purview of the invention if the various groups of coil springs or analogous resilient elements (such as the spring 20 and the springs 23, 24 which cooperate with the control plate 26 at timely staggered intervals, i.e., during different portions of the second stage of angular movement of the component including the discs 10, 12 and/or component including the hub 1 and its flange 3) are disposed in series rather than in parallel as well as in series with the control plate 26 of the friction generating unit 25. The arrangement is then preferably such that the spring 20 (which is active during the first portion of the second stage) is bypassed during transition from the first to the second portion of the second stage. During the first portion of the second stage, or at least during a certain part of the first portion, the force with which the spring 20 tends to return the one and/or other component of the clutch plate to neutral angular position is at least slightly smaller than the force with which the unit 25 opposes rotation from the neutral angular position, and the springs which tend to rotate the one and/or other component toward the neutral angular position during the entire second portion or during a certain part of the second portion of the second stage apply to such component a force exceeding the force with which the friction generating unit 25 opposes rotation of the one and/or other component during the second portion of the second stage.

As mentioned above, the hardness or rigidity of springs which tend to return to one and/or the other component of the clutch plate to neutral angular position and which are active during the second portion of the second stage is preferably selected in such a way that the force which is applied by these springs exceeds the friction force which is generated by the unit 25. Such design of the clutch plate is desirable because the springs which are active during the second portion of the second stage invariably return the control plate 26 to its starting position as soon as the extent of angular displacement of the one and/or other component of the clutch plate from neutral angular position is less than the angle $alpha_1$ or $beta_1$. This is achieved by the aforediscussed selection of the initial stressing (X) of the springs 23, 24 in such a way that their initial stress exceeds the frictional force (Y) which is generated by the unit 25. However, reliable return movement of the control plate 26 to its starting position is achieved also if the combined stressing of all springs which oppose rotation of the one and/or other component of the clutch plate beyond the angle $alpha_1$ or $beta_1$ exceeds the force Y. In other words, if the energy which is stored by the springs 20, 23 and 24 at the time the discs 10, 12 and/or parts 1, 3 begin to move away from the neutral angular position through an angle which exceeds $alpha_1$ or $beta_1$ is greater than Y, the control plate 26 will invariably return to the starting position as soon as the angle is reduced to less than $alpha_1$ or $beta_1$.

The provision of protuberances 39, 39a in addition to the projections 31 is desirable and advantageous when the control plate 26 must transmit a pronounced torque. It will be noted that the protuberances 39, 39a are disposed at the periphery (i.e., on the outer marginal portion) of the annular control plate 26 and cooperate with the projections 31 to limit the extent of angular displacement of the control plate relative to the component including the hub 1 and its mounting flange 3. An advantage of protuberances (39, 39a) and projections (31) which are located at a substantial distance from the axis of the hub 1 is that the effective diameter reduces the influence of manufacturing tolerances upon the accuracy of regulation of angular displaceability of the control plate 26 with reference to the hub 1.

The drawing shows a presently preferred design of the clutch plate wherein the control plate 26 is formed with six windows (33 to 38) which are disposed in pairs and the windows of each pair are disposed diametrically opposite one another with reference to the common axis of the discs 10, 12 of the hub 1. Thus, the window 33 for the spring 19 is disposed diametrically opposite the window 34 for the spring 20; the windows 35, 36 for the springs 21, 22 are disposed diametrically opposite each other; and the windows 37, 38 for the springs 23, 24 are also disposed diametrically opposite each other. The dimensions of the window 34 for the spring 20 are such that the spring 20 is compressed and stores energy as soon as the angular displacement of the one and/or other component of the clutch plate exceeds $alpha_1$ or $beta_1$. On the other hand, the dimensions of windows 35 to 38 in the control plate 26 are such that they exceed those of the corresponding windows (6, 7, 8, 9) in the discs 10, 12, as considered in the circumferential direction of the clutch plate. The dimensions of the window 33 for the spring 19 are such that this spring need not come in any contact with the control plate 26, i.e., the spring 19 need not undergo additional stressing in response to rotation of the control plate 26 with reference to the hub 1.

The claims refer to rotation of the second component (including the discs 10, 12) with reference to the first component (including the hub 1 and the mounting flange 3) of the clutch plate. This is intended to further embrace rotation of the second component with reference to the first component, simultaneous rotation of both components in opposite directions, as well as simultaneous rotation of both components in the same direction but at different speeds.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A clutch plate, especially for use in clutches, comprising a first component; a second component rotatable within limits with reference to said first component; and means for yieldably opposing rotation of said second component with reference to said first component, including a friction generating unit having control means and being arranged to oppose rotation of said second component during a second stage which follows a first stage of such rotation, and at least two energy storing devices acting between said control means and at least one of said components, one of said devices being arranged to cooperate with said control means in opposing rotation of said second component during a first and a subsequent second portion and the other of said devices being arranged to cooperate with said control means in opposing rotation of said second component only during said subsequent second portion of said second stage.

2. The clutch plate of claim 1, wherein said control means includes a substantially plate-like annular body having a plurality of windows for portions of said energy storing devices.

3. The clutch plate of claim 2, wherein said body has three pairs of windows and the windows of each pair are disposed substantially diametrically opposite one another with reference to the axis of said second component.

4. The clutch plate of claim 3, wherein said rotation opposing means comprises at least one additional energy storing device installed in one window of one of said pairs, said one energy storing device being installed in the other window of said one pair.

5. The clutch plate of claim 4, wherein said other energy storing device comprises at least two resilient elements installed in the windows of the other pairs.

6. The clutch plate of claim 5, wherein the other window of said one pair is dimensioned so that said control means and said first component cooperate and stress said one energy storing device as soon as the extent of rotation of said second component exceeds said first stage, the windows for the resilient elements of said other energy storing device being dimensioned so that such resilient elements are stressed by said control means in cooperation with said first component only when the extent of rotation of said second component is such that the latter completes said first stage and the first portion of said second stage of angular movement with reference to said first component.

7. The clutch plate of claim 6, wherein the dimensions of said one window of said one pair are such that said additional energy storing device is stressed between said control means and said first component simultaneously with the resilient elements of said other energy storing device.

8. The clutch plate of claim 1, wherein said first component comprises a hub and a flange surrounding said hub and being rigid therewith, said second component comprising a pair of interconnected discs disposed at the opposite sides of said flange and surrounding said hub, said control means being disposed between said flange and one of said discs and said friction generating unit further comprising spring means interposed between said flange and the other of said discs and directly engaging said control means, said spring means reacting against said other disc to bias said control means axially toward said one disc.

9. The clutch plate of claim 8, wherein one of the parts including said control means and said spring means comprises at least one substantially axially extending projection and said flange has an opening through which said projection extends.

10. The clutch plate of claim 9, wherein said control means includes at least one protuberance and said flange has a socket receiving said protuberance with a predetermined clearance, as considered in the circumferential direction of said flange.

11. The clutch plate of claim 10, wherein said control means includes a substantially plate-like annular body having an outer marginal portion and said protuberance is provided on said outer marginal portion of said body.

12. The clutch plate of claim 10, wherein said control means is rotatable with reference to said first component and said protuberance cooperates with said projection to limit the extent of angular movement of said control means with reference to said first component.

13. The clutch plate of claim 9, wherein said projection includes an arm which is provided on said control means.

14. The clutch plate of claim 8, wherein said control means comprises two groups of protuberances and said flange has sockets receiving said protuberances with at least some clearance, as considered in the circumferential direction of said hub.

15. The clutch plate of claim 14, wherein said control means is rotatable with reference to said flange in first and second directions, the protuberances of one of said groups being operative to limit the extent of rotation of said control means in one of said directions and the protuberances of the other of said groups being operative to limit the extent of rotation of said control means in the other of said directions.

16. The clutch plate of claim 8, wherein said control means comprises at least one integral lug extending in the axial direction of said components and said flange has an opening receiving said lug with at least some clearance, as considered in the circumferential direction of said hub.

17. The clutch plate of claim 1, wherein said one energy storing device comprises at least one resilient element and said other energy storing device comprises several resilient elements.

18. The clutch plate of claim 17, wherein the resilient elements of said other energy storing device are arranged to operate in parallelism with the resilient element of said one energy storing device during rotation of said second component in the second portion of said second stage.

19. The clutch plate of claim 18, wherein said resilient elements are compressible coil springs interposed between said second component and said control means.

20. The clutch plate of claim 1, wherein said rotation opposing means further comprises a plurality of energy storing devices acting between said first and second components and including said one and said other energy storing device.

21. The clutch plate of claim 20, wherein said first component includes a hub and said second component includes at least one disc angularly movably mounted on said hub.

22. The clutch plate of claim 20, wherein said one energy storing device and said other energy storing device are arranged to act between said components in parallelism with one another and to further act in parallelism with said control means.

23. The clutch plate of claim 1, wherein the force with which one of said energy storing devices opposes rotation of said second component differs from the force with which the other of said devices opposes rotation of said second component.

24. The clutch plate of claim 23, wherein each of said energy storing devices comprises at least one spring and the resiliency of the spring of one of said devices deviates from the resiliency of the spring of the other of said devices.

25. The clutch plate of claim 1, wherein each of said energy storing devices comprises at least one spring and the rigidity of the spring of said other energy storing device substantially exceeds the rigidity of the spring of said one energy storing device.

26. The clutch plate of claim 25, wherein said other energy storing device comprises several springs.

27. The clutch plate of claim 1, wherein at least one of said energy storing devices comprises at least one compressible spring.

28. The clutch plate of claim 1, wherein the moment of resistance which one of said energy storing devices offers to rotation of said second component deviates from the moment of resistance of the other of said devices.

29. The clutch plate of claim 1, wherein the moment of resistance which one of said energy storing devices generates to oppose rotation of said second component deviates from the moment of resistance which is generated by the other of said devices.

30. The clutch plate of claim 1, wherein said other energy storing device is arranged to oppose rotation of said second component during the second portion of said second stage with a force exceeding the force with which said one device opposes rotation of said second component during the first portion of said second stage.

31. The clutch plate of claim 1, wherein said energy storing devices are arranged to yieldably urge said second component to a neutral angular position with reference to said first component.

32. The clutch plate of claim 1, wherein the force with which said one energy storing device opposes rotation of said second component is less than the force with which such rotation is opposed by said friction generating unit, at least during a part of said first portion of said second stage, said other energy storing device being arranged to oppose rotation of said second component, at least during a part of the second portion of said second stage, with a force at least matching the force with which such rotation is opposed by said friction generating unit.

33. The clutch plate of claim 1, wherein each of said energy storing devices comprises at least one resilient element tending to move said second component toward a neutral angular position with reference to said first component and the resilient element of said other energy storing device is interposed between said control means and at least one of said components in prestressed condition so that its resistance to rotation of said second component from said neutral position exceeds the force with which said friction generating unit opposes such rotation of said second component.

34. The clutch plate of claim 1, wherein each of said energy storing devices comprises at least one resilient element tending to move said second component toward a neutral angular position with reference to said first component, said one and said other energy storing device jointly opposing rotation of said second component during the second portion of said second stage with a force exceeding the force with which said friction generating unit opposes such rotation of said second component.

35. The clutch plate of claim 1, wherein said rotation opposing means further comprises an additional energy storing device arranged to oppose rotation of said second component during said first stage, said one energy storing device being arranged to oppose rotation of said second component during each portion of said second stage and said other energy storing device being arranged to oppose rotation of said second component only during the second portion of said second stage.

* * * * *